No. 730,413. PATENTED JUNE 9, 1903.
J. W. STREHLI.
PULLEY.
APPLICATION FILED JULY 31, 1902.
NO MODEL.
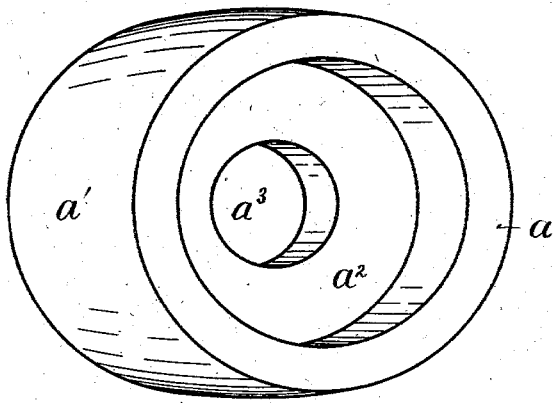
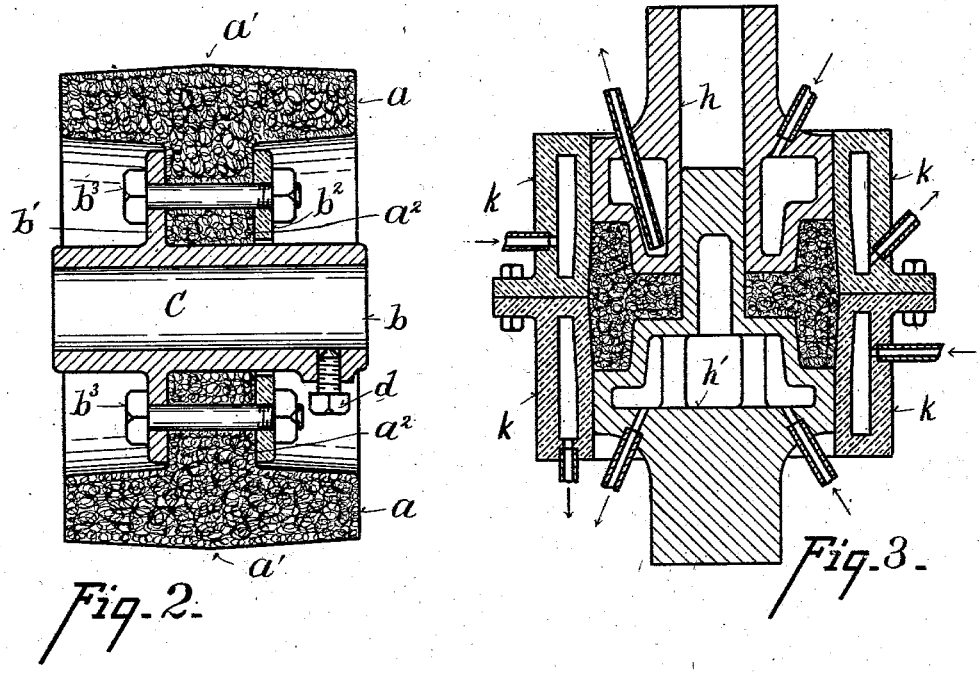
Witnesses
John M. Edwards
John H. Munson
Inventor
J. W. Strehli No. 730,413. Patented June 9, 1903.

UNITED STATES PATENT OFFICE.

JOHN W. STREHLI, OF CINCINNATI, OHIO.

PULLEY.

SPECIFICATION forming part of Letters Patent No. 730,413, dated June 9, 1903.

Application filed July 31, 1902. Serial No. 117,738. (No model.)

*To all whom it may concern:*

Be it known that I, JOHN W. STREHLI, a citizen of the United States, residing at Cincinnati, in the county of Hamilton and State of Ohio, have invented certain new and useful Improvements in Pulleys, of which the following is a specification.

The object of my invention is to produce a cheap, simple, and effective pulley from pulp or any compressible material mixed with materials which tend to hold the belt and the pulley together and the belt in the center of the pulley and keep it from slipping, and thus produce an increased coefficiency of friction between the belt and pulley-surface.

A further object is to produce a pulley which when once balanced will always retain that efficiency; and a still further object is to produce a pulley which shall be waterproof and not affected by varying changes in the atmosphere, and, lastly, a pulley having lightness and strength. The pulley-body is made in one piece, the material being molded or pressed together into a homogeneous mass in a dry state in heated molds, the pulley-body being dry and complete when it leaves the molds. Pulleys with these features and advantages are especially useful for all high-speed machinery and for dynamos, motors, and the like. Iron pulleys are objectionable, as they are heavy, wear smooth, get out of balance, and let the belt slip. Paper pulleys made by laying a great number of sheets of strawboard or the like in juxtaposition become dry and split, are changed by varying degrees of atmosphere, and must be kept in a dry place, and they also wear smooth. Wooden pulleys warp and crack and wear smooth. Pulleys made of a series of pulp-pressed boards glued together and lying in juxtaposition are also expensive and crack and no uniformity of surface can be produced, as the material and pressure by which they are made cannot always be the same in texture and degree. It is also difficult to get these pulleys to balance and run perfectly. The slipping of the belt is very annoying, and the power lost from this cause is never known, but is extensive and costly. To overcome the smooth surface of these pulleys, many kinds of dressings are used; but this only temporarily and partially relieves the defect. By my present invention I overcome all these defects and form a perfectly balanced and crowned pulley which retains its efficiency under all circumstances, no dressing being necessary to assist in holding the belt, and the pulley never wears smooth or allows the belt to slip. Friction-wheels of equal merit can also be made.

In the accompanying drawings, forming part of this specification, Figure 1 is a perspective view of the body of my new pulley; Fig. 2, a section thereof, also showing the hub by which it is attached to the shaft; and Fig. 3, a sectional view of dies to form the pulley, a pulley-body being shown in section finished in the dies ready to be removed.

I take wood-pulp, straw-pulp, paper, cotton, tow, fiber, or any compressible material and divide it either into small particles or strips or into any desired state of comminution. This forms the body of the pulley and possesses the necessary strength, while being very light. With this body material I mix a binder consisting of resinous matter or pitch or any suitable or equivalent material. I prefer to use rosin. By using a comparatively large proportion of such a resinous binder I produce the clinging effect hereinafter described. I mix with the rosin and pulp any other material to give it a harder body, such as slaked lime or any equivalent material. I may also add waterproofing material, such as linseed-oil or fatty substances or paraffin or equivalent materials, which will prevent the pulley from being affected by changes in the temperature. I may distribute the material in the molds for pressing the pulley-body in such a manner that the binder (which is also the material I use to make the belt adhere to the pulley) will come upon the outside or face of the pulley; but in any event all the materials must be evenly distributed around the axis, so that the pulley shall be balanced.

Perhaps the most essential feature of the present invention is that I use a considerable quantity of resinous or equivalent material to make the pulley cling to the belt with greater traction or adhesion. Thus the pulley will be thoroughly and properly governed by the belt, and in this manner the great coefficiency of friction between the belt and pulley is brought into being.

In the drawings, $a$ represents the rim of the pulley, $a'$ the face of the pulley, and $a^2$ the inwardly-extending web thereof. The rim $a$ is least in thickness at the edge and increases in thickness until it reaches the web $a^2$, as shown. In this way the pulley is crowned and made strong. Through an axial opening $a^3$ in the web I place the hub $b$ of the pulley. The hub has cast on it a flange $b'$, a loose ring $b^2$ being slipped over the hub $b$. The bolts $b^3$ are then put into place through said flange and through the web of the pulley-body and tightened, and the hub $b$ is tightly held in place in the pulley. The shaft on which the pulley is to work is slipped through the opening $c$ in the hub $b$ and the pulley held tightly on said shaft by set-screw $d$. This is one of the ordinary means of attaching the hub to the pulley-body and the pulley to the shaft, and any other means may be employed.

The pulley-body is made as follows: The pulp in a divided state is mixed with the materials which render the pulley clinging by nature, as set forth above, and placed in a dry state in molds, consisting of an upper die $h$ and a lower die $h'$ and an outside casing $k$, in which they work up and down and subjected to the action of a hydraulic or other powerful press, the dies being heated by steam-jackets, as shown. I may heat the dies in any other manner desired, or I may put the material in the molds partly heated and melted. I use just enough heat to soften and melt the pulp and other ingredients until they run together, so that the mass will be homogeneous and the pulp and the binder or adhesive-rendering material will combine uniformly.

What I claim as new is—

1. A pulley-body composed of a base of pulp, and a binder, whereof the binder is in greater proportion to the base than is necessary for its binding effect alone, whereby there will be adhesion between the surface of the pulley and the belt.

2. A pulley-body composed of a base of pulp and a resinous binder in a homogeneous mass and in such proportions that there will be adhesion between the surface of the pulley and the belt.

3. A pulley-body consisting of a base of pulp and a binder, the binder acting as such throughout and the proportion of binder being greater at the face of the pulley, as and for the purpose set forth.

4. A pulley-body composed of a base of pulp, a binder, and a hardening material, all in such proportions that there will be adhesion between the surface of the pulley and the belt.

5. A pulley-body consisting of a base of pulp, a binder, a hardening material, and a waterproofing material, all in such proportions that there will be adhesion between the surface of the pulley and the belt.

JOHN W. STREHLI.

Witnesses:
JOHN M. EDWARDS,
JOHN H. MUNSON.